Figure 1:
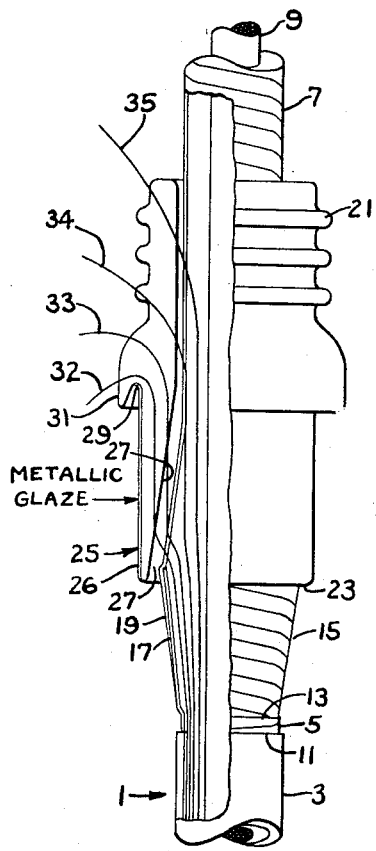

March 24, 1959  J. H. NICHOLAS  2,879,322
INSULATOR FOR HIGH VOLTAGE TERMINATOR
Original Filed April 4, 1951

INVENTOR.
JAMES H. NICHOLAS
BY
Atty

United States Patent Office 2,879,322
Patented Mar. 24, 1959

2,879,322

INSULATOR FOR HIGH VOLTAGE TERMINATOR

James H. Nicholas, Chicago, Ill., assignor to G & W Electric Specialty Company, Chicago, Ill., a corporation of Illinois Original application April 4, 1951, Serial No. 219,294, now Patent No. 2,748,184, dated May 29, 1956. Divided and this application September 1, 1953, Serial No. 377,892

1 Claim. (Cl. 174—140)

This application is a division of application Serial No. 219,294, filed April 4, 1951, now Patent 2,748,184, issued May 29, 1956.

This invention relates to insulators for use in high voltage electrical terminating devices and is particularly concerned with solid-type insulators for use with gradient controlling means in such terminating devices.

The invention provides a novel insulator which is constructed and arranged to obviate the need for very long internal insulators within the outer insulator of the terminator and also to enable the use of shorter outer insulators.

High voltage cables generally include wrapped insulation surrounding the cable conductor. In the preparation of the cable conductor for the formation of the terminator the wrapped insulation is overlaid by a stress cone, also of wrapped insulation or its equivalent, and which cone is covered at one end with grounded shielding braid. It is known that the dielectric strength of wrapped insulation in an axial direction is only a small fractional part of the dielectric strength of the same insulation in a radial direction. This percentage may be as low as five or six percent. Therefore, at high electrical stress, dielectric breakdown may occur in an axial direction unless means is provided to reduce the dielectric stress in that direction. In order to reduce the possibility of dielectric breakdown in an axial direction, means are provided for controlling the direction of the equipotential surfaces in the stress control cone. This control means includes, as an integral and important part thereof, a novel insulator element forming one aspect of the present invention.

The construction of the control means is such as to cause the equipotential lines or surfaces at the region of maximum dielectric stress to be in a direction as nearly as possible axially of the cable conductor. If it were possible to make the equipotential surfaces extend truly axially of the wrapped insulation then there would be no axial dielectric stress. To the extent that this is not accomplished there is stress in an axial direction. If this stress does not exceed five or six percent of the maximum radial stress of the cable insulation the optimum conditions are obtained because under those circumstances the dielectric strength of the wrapped insulation is as effective in an axial direction as in a radial direction. This object is accomplished, in accordance with one aspect of the invention, by means of a conducting surface or electrode, in intimate contact with a stress control tube, of solid, inorganic homogeneous insulation of high dielectric properties in all directions, such as, for instance, a wet process porcelain insulator. The conducting electrode, which will be often referred to as the stress control tube electrode, is in intimate contact with the insulator, and may comprise a metallic glaze at the surface of the insulator which forms a conducting surface surrounding the stress control tube.

The stress control tube insulator and attached conducting surface must be properly located with respect to the parts of the terminator and cable to perform its intended function. More specifically, one end of the conductive surface on the stress control tube is in close proximity to the grounded shielding braid on the stress control cone. The underlying insulator making up the stress control tube is placed as close as possible to the insulator on the cable, allowing only enough space between them for the free expansion of the cable conductor and its wrapped insulator under temperature changes that occur in the terminator. To this end, the stress control tube is tapered in thickness to a minimum thickness at its end nearest the grounded shielding braid. The stress control tube extends a sufficient distance beyond the grounded portion of the wrapped cable insulation and beyond the conducting glaze to impart the proper direction to the equipotential surfaces in the wrapped dielectric around the cable conductor. The arrangement is such that the equipotential surfaces in the cable insulation wrapping approach an axial direction so that the electrostatic gradient in an axial direction is minimum. Since very high potential gradients can be readily withstood by a properly designed porcelain tube, the present invention provides a structure wherein the maximum potential gradients in an axial direction occur within the porcelain instead of within the wrapped cable insulation.

It is known that wet process porcelain can withstand a higher potential gradient than can the usual insulating oils or compounds that are used in high voltage terminators. It is therefore an object of the present invention so to terminate the stress control grounded electrode that surrounds the porcelain stress control tube that the maximum dielectric stress around the electrode will be in the porcelain body rather than in the liquid dielectric. The porcelain covers that end of the stress control electrode where the stress is greatest and keeps the oil away from the region of maximum dielectric stress. If the oil were not kept away from that region there would be a breakdown of the film of oil in immediate contact with the stress control electrode at the place of maximum stress. The "breaking down" would result in carbonization of the oil with the formation of a partially conducting surface or film. Under continuous high voltage or repeated surge potentials this carbonization could be progressive, finally resulting in complete electrical failure along the surfaces between ground potential and line potential electrodes. This is prevented by terminating the grounded electrode within the body of porcelain.

The attainment of the above and further objects of the present invention will be apparent from the following specification taken in conjunction with the accompanying drawings forming a part thereof.

Figure 2:
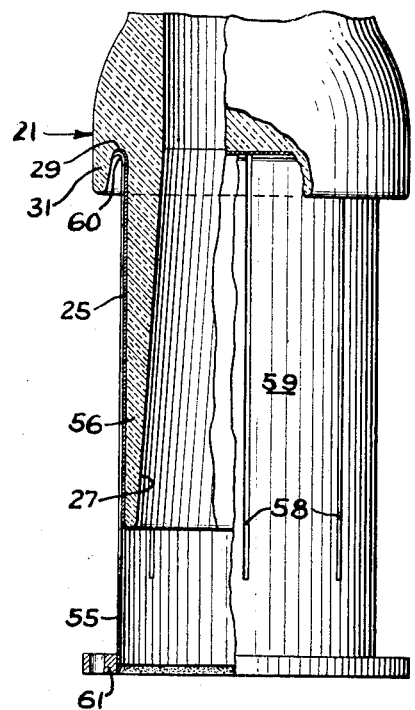

In the drawings:

Figure 1 is a diagrammatic view of a portion of a cable terminator, in partial section, for the purpose of illustrating the principles of the present invention; and Figure 2 is a fragmentary enlarged side view, in partial section, of the stress control tube of the terminator of Figure 1.

In Fig. 1 there is shown, diagrammatically, a portion of a cable terminator where the electrostatic stress control of the present invention is applied. The end of a cable that enters the terminator is indicated at 1, said cable including a tubular jacket 3, of "Polyethylene," within which there is the usual grounded cable shielding tape 5 that surrounds the wrapped cable insulation 7 around a cable conductor 9. The jacket at the end of the cable is removed in the usual manner to end at 11, and the shielded tape is removed to end at 13, as is usual in preparing the end of the cable for connection within a cable terminator. Thereafter, a stress cone insulation 15 is formed around the cable insulation 7. The ground connection of the shielding braid 5 is continued by a wrapping of metal braid 17 which continues up to and slightly beyond the point of maximum diameter of the stress cone and which is then covered by a wrapping of cover insulation 19. A stress control tube 21 of high grade ceramic insulation, such as wet process porcelain, is positioned over the insulated cable conductor, with the lower tubular portion 23 of the stress control tube extending below the top of the grounded shielding braid 17. The outside of the lower cylindrical portion 23 has a conducting metallic glaze 25 formed thereon, which glaze is electrically connected as by a conductor to the grounded portion at the end of the cable. The conducting glaze 25 is in intimate contact with its subjacent porcelain surface (see Fig. 2) so that there are no pockets whatsoever between it and the porcelain surface. The upper end of the conducting glaze terminates at 29 within the body of the porcelain stress control tube, said body having an overhanging portion 31 that overhangs the top of the conducting glaze 25. The structure of Fig. 1 is enclosed within the usual porcelain insulator or housing that is customarily provided on terminators. The lower end of the housing includes supporting parts which are grounded. The opposite end of the housing is connected to the cable conductor 9. The stress control tube 21 and attached electrode is positioned within the housing so that the top end of the conducting glaze 25 extends above the grounded lower portion of the housing. The relationship between the housing and the assembly shown in Fig. 1 is more fully shown and described in the above-mentioned application Serial No. 219,294.

The electric field pattern of Fig. 1 illustrates the action of the stress control tube in reducing the electrical stresses at the stress cone shielding braid. Equipotential lines 32, 33, 34 and 35 indicate, approximately, the voltage division between the cable conductor and ground at 12½%, 25%, 50% and 75%, respectively, of the cable to ground voltage. The potential gradient or dielectric stress in a particular zone is indicated by the distance between an equipotential line and an adjacent electrode, or between two adjacent equipotential lines.

It is known that the dielectric strength of wrapped insulation in the axial direction is only a small fractional part of the strength in the radial direction, say, of the order of five or six percent. Therefore, it is important that the distance between adjacent equipotential lines in an axial direction shall be substantially greater than the distance between the same equipotential lines in a radial direction, to reduce the probability of breakdown, particularly precisely at the place or places where the dielectric stress is greatest. This is accomplished by providing a grounded conducting glaze 25, which acts as an electrode, so located with respect to the grounded shielding braid 17 that in the region of the termination of the grounded shielding braid 17 the distances between the end of the braid 17 and the equipotential lines 32 as well as the distance between the equipotential line 32 and the equipotential line 33 is substantially greater in the axial direction than in the radial direction. This results in a reduction of the axial dielectric stress, where the dielectric strength of the wrapped insulation is minimum. It results in locating of the maximum dielectric stress between the grounded end 29 of the conducting glaze and the equipotential surface 32 within the porcelain of the stress control tube. Porcelain, being a homogeneous body of excellent dielectric properties in all directions, is better able to take the maximum stress than is the stress cone insulation in the axial direction.

Since the maximum potential gradients can be readily withstood by a properly designed porcelain stress control tube, the porcelain stress control tube can be used for two purposes, namely:

(a) Reduce axial stresses in the wrapped insulation of the stress cone and force the maximum axial potential gradient to occur in the porcelain dielectric;

(b) Raise the external (outdoor air) flashover value by locating the termination of the conducting glaze well above the external metal grounded parts supporting the housing (not shown), often called a "pothead," above referred to.

For example, an eight inch axial shift in the location of the porcelain stress control tube 21 above the external metal grounded supporting parts of the outer pothead porcelain in a 161 kv. pothead raised the external impulse flashover value from 625 kv. to 775 kv. Of course, shifting of the location of the porcelain stress control tube 21 with respect to the external metal grounded parts of the pothead necessitates corresponding shifting of the stress control insulation 15 so that the grounded shielding braid 17 of the stress cone insulation terminates in close proximity with the bottom of the conducting glaze 25.

The structure of Fig. 1, as previously set forth, is mounted within a porcelain insulator housing that is filled with poured insulation, such as oil or insulating compound, as is usual in the art. The point of maximum dielectric stress is at the upper end of the conducting glaze 25 which terminates in the porcelain tube and not in the oil or compound of the terminator. Insulating liquids such as are used in potheads have a tendency to break down at the place where they are subjected to an excessive dielectric stress. In the absence of the porcelain stress control tube this would occur at the film of oil that would be present at the outer top surface of the grounded conducting glaze or electrode 25. The "breaking down" would result in carbonization of the oil with the formation of a partially conducting surface or film. Under continuous high voltages or repeated surge potentials this carbonization could be progressive, finally resulting in complete electrical failure along the surfaces between ground potential and line potential electrodes. By the present invention this is eliminated because porcelain does not break down as would oil, and the metal glaze terminating within the body of porcelain prevents local break down.

The porcelain stress control tube 21 is supported by a cylindrical spun copper tube bracket 55 into which the bottom cylindrical portion 56 of the stress control tube 21 fits snugly. To facilitate gripping of the insulator the upper end of the bracket 55 has a number of longitudinal saw cuts 58 therein forming resilient spring fingers 59 that grip the lower sleeve portion 56 of the porcelain stress control tube and not only support it but also provide a ground connection to the conducting glaze 25. The upper end of the bracket 55 is outwardly flared along smooth curves to form a peripherally extending lip, as indicated at 60, which lip constitutes a bearing support for the stress control tube 21. The bracket 55 has a metal mounting ring 61 welded or otherwise secured to the bottom thereof, which ring is supported by a series of bolts (not shown).

A description of what is believed to be the theory of operation of the stress control tube 21 will now be given, for which reference should be made more particularly to Fig. 1. The equipotential line 32 extends radially outwardly to some extent at the place where it leaves the stress control cone 15. The greater the distance between the electrode 25 and the stress cone 15 the greater would be the radial component of the equipotential line 32 at the place where it leaves the stress control cone 15. In order that this component shall be kept at a minimum, that is, in order that the equipotential line 32 shall extend as nearly axially as possible at the place where it leaves the stress cone 15, it is essential that the electrode 25 shall be as close as possible to the stress cone 15. It is for that reason that the stress tube 21 is brought as close as possible to the stress cone and is made as thin as possible at its lower end, within reasonable manufacturing tolerances, and for that reason it is tapered at its lower end, the taper being on the inner side. In view of the fact that the stress control tube 21 is not relied upon to hold the hydrostatic pressure that exists within the terminator, it is apparent that the stress control tube can be made quite thin, within manufacturing tolerances, which permits the conducting glaze or electrode 25 to be brought very close to the stress cone 15.

As previously stated, the uppermost portion of the stress control electrode 21 should extend above the grounded supporting parts on the terminator housing which surrounds the assembly shown in Fig. 1, as shown in my pending application Serial No. 219,214. This causes the upper portion of equipotential lines 32 to extend outwardly and downwardly, as shown. The next equipotential line 33 is spaced considerably above the line 32 and is of a lesser slope within the housing. As a result of the downward slope of the equipotential lines, which is brought about by the fact that the grounded stress control electrode 25 terminates substantially above the grounded parts of the terminator housing, the potential gradient on the outside of the terminator housing, in a direction axially thereof, is substantially reduced. It is this that raises the external (outdoor air) flashover value. Since the external flashover value is thus raised, it is possible to make the terminator housing of a smaller overall length than would otherwise be required for the voltages involved if the porcelain stress control tube and its associated electrode 25 were not provided.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

An insulator comprising a tubular housing body of solid insulating material having intermediate the ends thereof a mass of insulating material overhanging a portion of the body around its periphery and forming an axially extending annular recess on the outside of the body, a tubular electrode surrounding said body beneath said overhang and terminating within the recess at an axially inner part of said recess, a conductive tubular support bracket in telescopic relation with said tubular electrode and having a top edge abutting and seating said overhanging mass of material, and a series of longitudinal slots in said tubular bracket forming resilient fingers therebetween which make electrical contact with said tubular electrode.

References Cited in the file of this patent
UNITED STATES PATENTS

| | | |
|---|---|---|
| 1,735,560 | Austin | Nov. 12, 1929 |
| 1,778,253 | Fischer | Oct. 14, 1930 |
| 1,788,395 | Jansson | Jan. 13, 1931 |
| 1,870,141 | Regerbis et al. | Aug. 2, 1932 |
| 2,310,201 | Cox | Feb. 9, 1943 |
| 2,408,990 | Mitchell | Oct. 8, 1946 |
| 2,447,674 | Strom et al. | Aug. 24, 1948 |
| 2,472,721 | Nergaard | June 7, 1949 |
| 2,651,670 | Bosworth | Sept. 8, 1953 |